US 10,343,361 B2

(12) United States Patent
Henriksen

(10) Patent No.: US 10,343,361 B2
(45) Date of Patent: *Jul. 9, 2019

(54) EXPANDABLE RIM WIDTH INSERT

(71) Applicant: BRIDGESTONE BANDAG, LLC, Nashville, TN (US)

(72) Inventor: Eric M. Henriksen, Muscatine, IA (US)

(73) Assignee: Bridgestone Bandag, LLC, Muscatine, IA (US)

(*) Notice: Subject to any disclaimer, the term of this patent is extended or adjusted under 35 U.S.C. 154(b) by 107 days.

This patent is subject to a terminal disclaimer.

(21) Appl. No.: 15/454,855

(22) Filed: Mar. 9, 2017

(65) Prior Publication Data

US 2017/0173909 A1   Jun. 22, 2017

Related U.S. Application Data

(63) Continuation of application No. 14/868,839, filed on Sep. 29, 2015, now Pat. No. 9,623,617.

(60) Provisional application No. 62/194,861, filed on Jul. 21, 2015.

(51) Int. Cl.
   *B29D 30/26*   (2006.01)
   *B29D 30/54*   (2006.01)

(52) U.S. Cl.
   CPC ............ *B29D 30/54* (2013.01); *B29D 30/26* (2013.01); *B29D 2030/541* (2013.01); *B29D 2030/549* (2013.01)

(58) Field of Classification Search
   CPC .. B29D 30/54; B29D 30/26; B29D 2030/541; B29D 2030/549

USPC ........................................................ 157/21
   See application file for complete search history.

(56) References Cited

U.S. PATENT DOCUMENTS

| 2,124,345 | A | * | 7/1938 | Grange | .................. | B60B 25/04 |
| | | | | | | 152/411 |
| 2,418,584 | A | | 4/1947 | Hawkinson | | |
| 2,614,603 | A | | 10/1952 | Howley | | |
| 2,865,053 | A | | 12/1958 | Heinze | | |
| 2,921,338 | A | * | 1/1960 | Glynn | .................. | B29D 30/54 |
| | | | | | | 157/1.1 |

(Continued)

FOREIGN PATENT DOCUMENTS

| EP | 1547758 A2 | 6/2005 |
| FR | 932102 | 3/1948 |

(Continued)

OTHER PUBLICATIONS

Henry Simon Limited, English abstract of FR932102, dated Mar. 12, 1948.

(Continued)

*Primary Examiner* — Hadi Shakeri
(74) *Attorney, Agent, or Firm* — Matthew W. Jupina; Eley Thompson

(57) ABSTRACT

A machine for retreading tires includes a rotatable hub and an expandable rim disposed around the moveable hub. The expandable rim includes a plurality of shoes, each shoe having a flange segment on either side of a rim segment of the plurality of shoes. An adapter is attached to each of the flange segments such that an expandable rim width is decreased. A method for modifying a width of an expandable rim for use in a tire retreading machine comprising is also disclosed.

13 Claims, 5 Drawing Sheets

(56) References Cited

U.S. PATENT DOCUMENTS

| | | |
|---|---|---|
| 2,940,124 A | 6/1960 | Branick |
| 2,973,791 A | 3/1961 | French |
| 3,331,412 A | 7/1967 | Sornsen |
| 3,614,969 A | 10/1971 | Breiner |
| 3,741,268 A | 6/1973 | Brewer |
| 3,770,032 A * | 11/1973 | Stull ..................... B60C 25/00 157/16 |
| 4,274,897 A | 6/1981 | Barefoot |
| 4,323,414 A | 4/1982 | Severson |
| 4,529,367 A | 7/1985 | Fike |
| 4,738,604 A | 4/1988 | Fike |
| 4,781,233 A | 11/1988 | Williams |
| 5,010,759 A | 4/1991 | Yokomizo et al. |
| 5,095,744 A | 3/1992 | MacEcek et al. |
| 5,518,384 A | 5/1996 | Presti et al. |
| 5,544,945 A | 8/1996 | Daudi |
| 5,653,847 A | 8/1997 | King et al. |
| 6,251,204 B1 | 6/2001 | Andersson et al. |
| 2017/0021581 A1 | 1/2017 | Henriksen et al. |
| 2017/0326827 A1 | 11/2017 | Henriksen et al. |

FOREIGN PATENT DOCUMENTS

| | | |
|---|---|---|
| JP | 04-341835 A | 11/1992 |
| KR | 10-2013-0054941 | 5/2013 |
| WO | WO2004/012927 A1 | 2/2004 |

OTHER PUBLICATIONS

Kang, Min Jeong; International Search Report and Written Opinion for PCT/US2016/041910; dated Oct. 20, 2016; pp. 1-12; Korean Intellectual Property Office; Daejeon; Republic of Korea.

Bridgestone Corporation, English abstract of JP04-341835A, dated Nov. 11, 1992.

Bridgestone Bandag, LLC, English abstract of KR10-2013-0054941, dated May 27, 2013.

* cited by examiner

EXPANDABLE RIM WIDTH INSERT

CROSS-REFERENCE TO RELATED APPLICATIONS

This application is a Continuation of U.S. patent application Ser. No. 14/868,839, filed Sep. 29, 2015, which claims priority to U.S. Provisional Patent Application No. 62/194,861 filed Jul. 21, 2015 and entitled "Expandable Rim Width Insert", the entire disclosure of which is incorporated herein by reference. This application is related to U.S. Non-Provisional patent application Ser. No. 14/868,839 filed Sep. 29, 2015 and entitled "Expandable Rim Width Insert", the entire disclosure of which is incorporated herein by reference.

FIELD OF THE DISCLOSURE

The field relates generally to an apparatus and method of using adapters to modify a rim width for an existing expandable rim suited for mounting a tire or a casing onto a machine.

BACKGROUND

Retreaded tires provide an economical way to gain additional use from tire casings after the original tread or retread has become worn. According to a method of retreading, sometimes referred to as cold process retreading, a worn tire tread and other materials on a used tire are removed to create a buffed, generally textured, treadless surface along the circumference of the tire casing to which a new tread may be bonded.

The tire casing may be inspected for injuries, some of which may be skived and filled with a repair gum while others may be severe enough to warrant rejection of the tire casing. After completion of the skiving process, the buffed surface may be sprayed with cement that provides a tacky surface for application of bonding material and new tread. Next, a layer of cushion gum may be applied to the back, i.e., the inside surface of a new tread, or alternatively, the layer of cushion gum may be applied directly to the tacky surface on the tire casing. There are other methods that may eliminate the need for cement or cushion gum. The cushion gum is a layer of uncured rubber material. The cushion gum and tread may be applied in combination about the circumference of the tire casing to create a retreaded tire assembly for curing. As an alternative, a length of tire tread may be wrapped around the tire casing with the cushion gum already applied. The cushion gum may form the bond between the tread and the tire casing during curing.

Certain retreading processes such as the buffing of the tire casing may be carried out on specialized equipment that rotatably mount the casing onto an expandable rim. The expandable rim may include various sections that move radially outwardly with respect to a central hub to expand to a circumference of the rim and sealably engage the beads of the casing, which is inflated to provide a resilient surface that can be buffed or otherwise processed. The machine may include a rasp that can be applied to the surface of the tire to remove rubber. Because the circumference of a tire casing can more easily be measured by the operator, the desired final radius of the tire casing is may be identified in relation to the final circumference of the tire casing.

Expandable rims have a rim width that is fixed for a given machine. However, such fixed widths are not suitable for processing tires or casings having different widths, thus necessitating the purchase and installation of expandable rims having different widths between production runs of different tires. In some instances, the width of such rims may be adjusted by cutting and welding the expandable rims to adjust the width of the rim, for example shorten the initial width of the rim. This is costly and also permanently changes the width of the expandable rim so that the rim is no longer usable with tires having a width equal to the initial width.

SUMMARY

Some embodiments include systems and methods for adjusting a width of a rim enabling mounting of tires of various widths on the rim, and in particular to adjusting a width of an expandable rim by mounting a plurality of adapters or inserts to at least a portion of a flange segment of the rim so that the rim has a resulting rim width different than an original rim width.

In some embodiments, a machine for retreading tires includes an expandable rim is configured to be disposed around a moveable hub. The expandable rim includes a plurality of shoes arranged symmetrically in a circumferential direction. Each of the plurality of shoes includes a base portion and a rim portion. The rim portion includes a rim segment and flange segments disposed on either side of the rim segment. The rim segment has an original rim width measured along the rotation axis of the rim between inward facing surfaces of the flange segments. A belt is disposed along the rim segment of the plurality of shoes. An adapter is attached to a flange segment of each of the plurality of shoes. The adapter extends over a circular segment of the expandable rim formed by the rim portion of the plurality of shoes and the adapter has a circular curvature corresponding to a circular curvature of the rim portion of each of the plurality of shoes. A resulting rim width measured along the rotation axis of the rim between at least one inward facing surface of the adapter and an inward facing surface of the flange segment at another side of the rim is different than the original rim width.

In some embodiments, a method for modifying the width of an expandable rim for use in a tire retreading machine includes assembling a plurality of shoes to form a cylindrical rim structure. Each of the plurality of shoes include a rim portion and a base portion. The rim portion includes a rim segment with a flange segment on either side of the rim segment. The rim segment has an original width measured along a rotation axis of the rim between inward facing surfaces of the flange segments. An adapter is attached to at least one flange segment of each shoe of the plurality of shoes. The adapter extends over a circular segment of the expandable rim formed by the rim portion of the plurality of shoes and the adapter has a circular curvature corresponding to a circular curvature of the rim portion of the each of the plurality of shoes. A resulting rim width measured along the rotation axis between at least one inward facing surface of the adapter and an inward facing surface of the flange segment on the other side of the rim segment or an inward facing surface of the another adapter attached to inward facing surface of the flange segment on the other side of the rim is different than the original rim width.

In some embodiments, a method for servicing a modified expandable rim for use in a tire retreading machine includes removing at least one existing adapter from a flange segment of a plurality of shoes. The plurality of shoes include a rim portion and a base portion. The rim portion includes a rim segment and the flange segments on either side of the rim segment. The adapter extends over a circular segment of the expandable rim formed by the rim portion of the plurality of shoes and has a circular curvature corresponding to a circular curvature of the rim portion of each of the plurality of shoes. A resulting rim width measured along the rotation axis between at least one inward facing surface of the existing adapter and an opposite inward facing surface of the flange segment is different than an original rim width. The original rim width is measured between inward facing surfaces of the flange segments. A belt surrounding the expandable rim is removed. The expandable rim is disassembled to separate the plurality of shoes. The plurality of shoes are reassembled to form the expandable rim. The belt is repositioned on the expandable rim. The at least one existing adapter is replaced with at least one new adapter.

BRIEF DESCRIPTION OF THE DRAWINGS

The foregoing description and other features will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Figure 1:
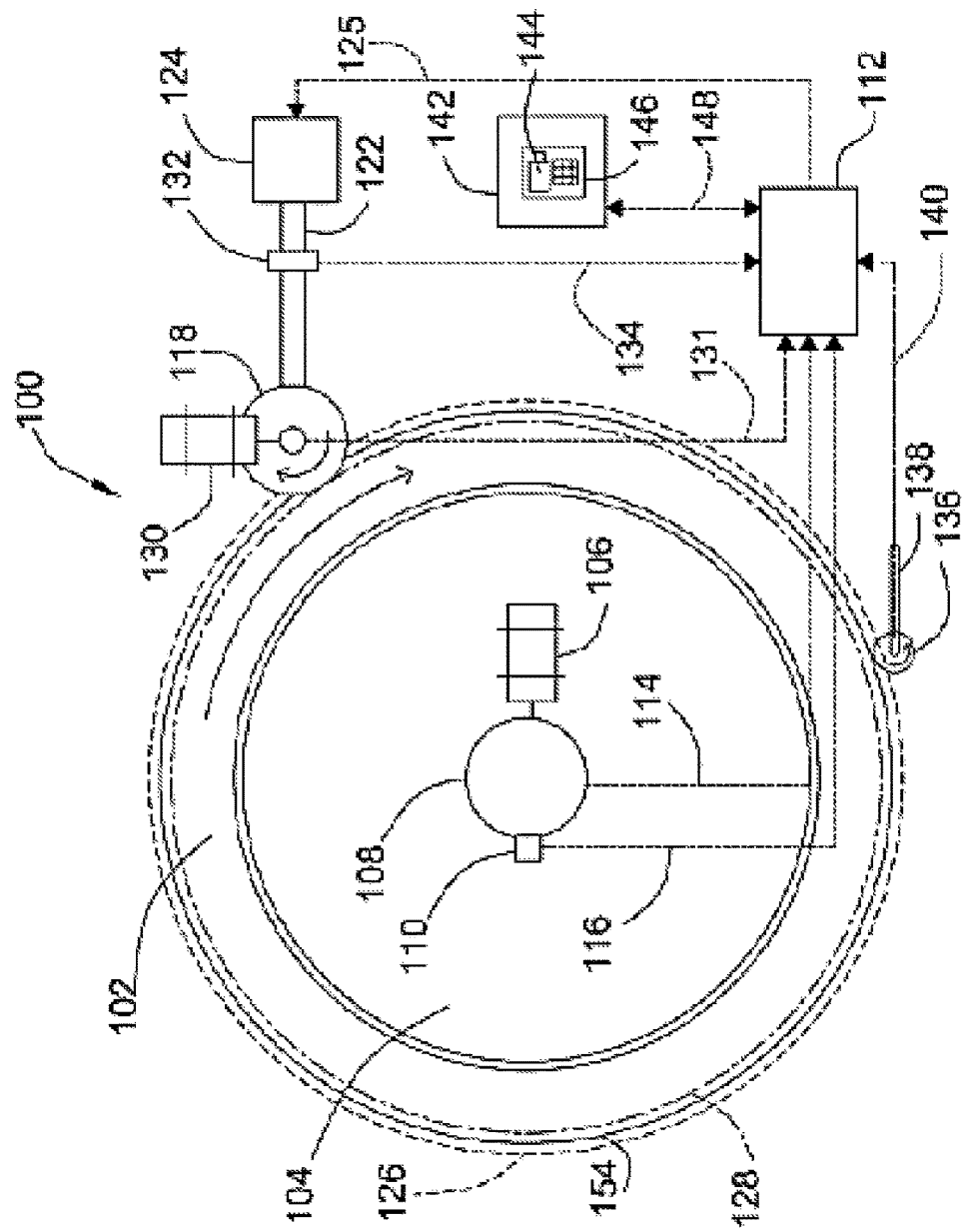
FIG. 1 is a schematic view of a tire buffing system in accordance with the disclosure.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the disclosure. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Some embodiments include systems and methods for adjusting a width of a rim enabling mounting of tires of various widths on the rim, and in particular to adjusting a width of an expandable rim by coupling a plurality of adapters or inserts to at least a portion of a flange segment of the rim so that the rim has a resulting rim width different than an original rim width.

A buffing machine 100 having a tire 102 mounted on a rotating, expandable rim 104 is shown schematically in FIG. 1. As shown, the machine 100 may be a standalone, dedicated machine for buffing tires prior to a retreading operation, or may alternatively be part of a retreading machine that can perform other operations, such as installing a new tread onto the casing.

During operation, the expandable rim 104 and tire 102 rotate at a constant angular rate of rotation during operation, for example, 60-90 revolutions per minute (RPM), but may also rotate at a variable speed. An electric motor 106 is connected to a hub 108 of the expandable rim 104 to provide the rotation of the tire 102, but any other type of rotary actuator may be used, such as hydraulically or pneumatically powered motors, or even mechanical arrangements providing a rotating output. As shown, the hub 108 includes timing features that are picked up by an angular displacement encoder 110 associated with the machine 100. A control signal of the motor 106 may be provided by an electronic controller 112 via a motor control conduit 114, while information indicative of the rotation of the hub 108 may be provided to the controller 112 by the encoder 110 via a tire rotation information conduit 116.

The machine 100 further includes a buffing tool or rasp 118. The rasp 118 may be any device capable of cutting material from the tire 102 as it rotates. In some embodiments, the rasp 118 can include a laminated steel drum having saw teeth arranged around its outer cylindrical surface.

Although many configurations are possible, the rasp 118 is connected to the machine 100 at the end of an arm 122. A rasp rpm sensor 132 is communicatively coupled to the rasp motor 130 and the electronic controller 112 via rasp rpm conduit 134, and configured to provide information on rasp 118 rotational speed to the electronic controller 112. The position of the arm 122 and of the rasp 118 relative to the tire 102 can be adjusted by a rasp actuator 124. The rasp actuator 124 positions a rasp head to sweep a circular arc across a face of the tire 102 at a defined radius. A force thus derived is caused by the interference between the rasp face and the circumference of the tire 102 being buffed. There are other arrangements of the arm 122, rasp actuator 124, and other parts of the cutting assembly that are known in the art and incorporated herein. This pressing or normal force effects removal of material from the tire 102 and is carried out in response to command signals provided by the electronic controller 112 via a rasp actuator control conduit 125. In FIG. 1, an outer circumference 126 of the tire 102 is illustrated by dashed line. In that same figure, a cutting depth 128, which is located radially inward from the outer circumference 126 relative to a center of the tire 102, is shown in dash-dot-dashed line.

The electronic controller 112 is communicatively coupled to an operation panel 142 via an input panel conduit 148. The input panel 142 includes an input device 146 (e.g., an alphanumeric keyboard, switches, buttons, etc.) and a display 144. A user can input commands, for example rasp 118 cutting depth, tire rotation speed, tread pattern, etc. via the input device 146. A cutting depth sensor 136 which can include a small rotatable wheel is positioned in contact with an outer surface of the tire 102 via a depth sensor mounting arm 138. The cutting depth sensor 136 is communicatively coupled to the electronic controller 112 via depth sensor conduit 140. While various sensors included in the buffing machine 100 are depicted as communicatively coupled to the electronic controller 112 via conduits, in some embodiments, each of the sensors, input panel 142 or otherwise electronic components can be wirelessly coupled to the electronic controller 112 (e.g., via Bluetooth®, Wi-Fi, or any other wireless communication protocol).

During a cutting operation, the rasp 118 is driven by a rasp motor 130 in a counter-rotational direction relative to the tire 102. The motor 130 is controlled and monitored by the electronic controller 112 through a motor control conduit 131. When the rasp 118 is in position at the cutting depth 128 and the rasp motor 130 is operating, material is removed from the outer portion of the tire 102 as the teeth or other cutting mechanism of the rasp 118 are pressed against the outer circumference 126 of the tire 102. To prevent rotation and to retain the tire 102 firmly on the expandable rim 104 during the cutting operation, the expandable rim 104 is placed in an expanded position such that a rubber skirt or belt (not shown) placed around an outer rim thereof sealably engages a bead of the tire 102 to seal the inner cavity of the tire 102 and inflate the tire 102 when air is pumped in its interior. The expandable rim 104 also laterally engages the bead of the tire 102 to ensure that the tire 102 maintains a proper inflated shape and is securely retained by the expandable rim 104 during the various operations that are performed on the tire 102.

Figure 2:
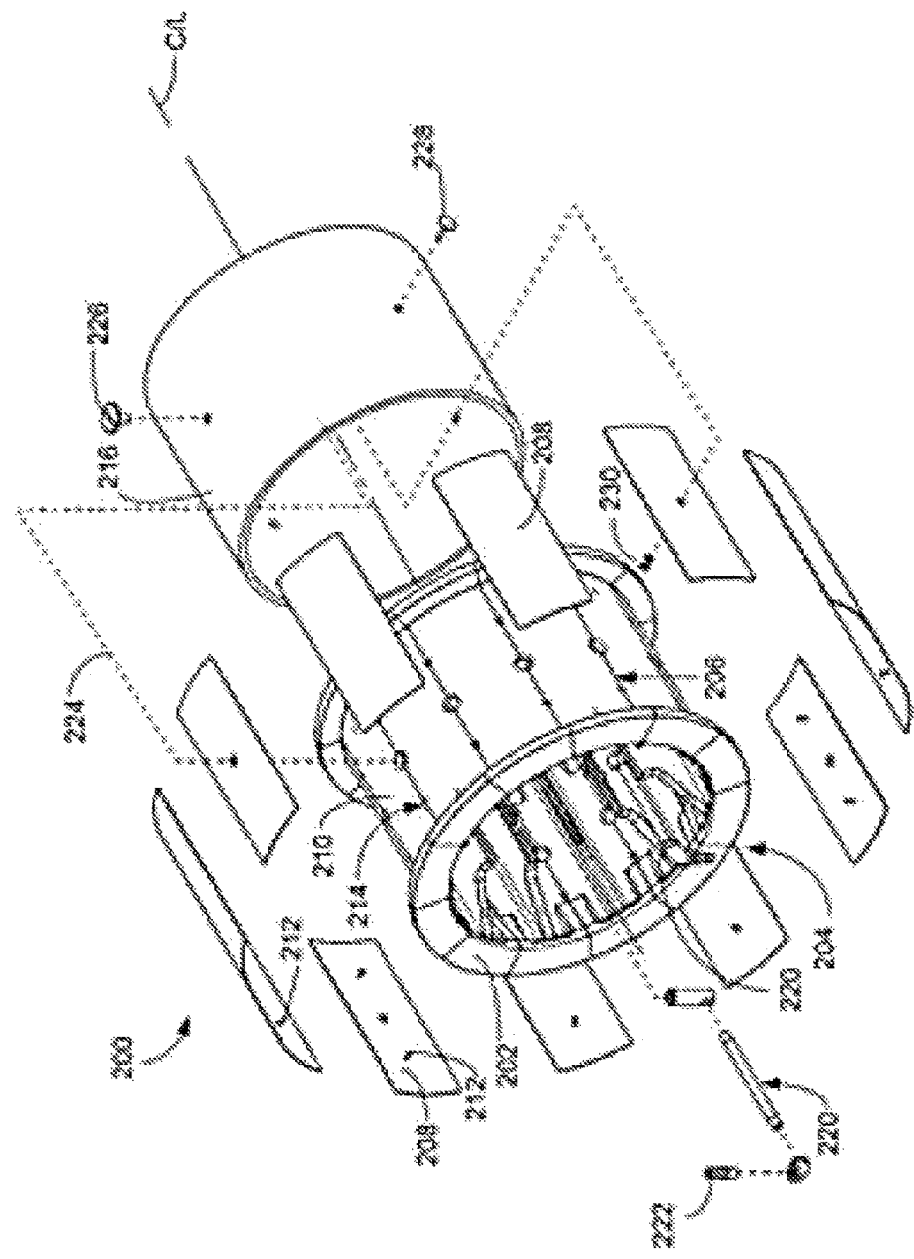
FIG. 2 is an exploded view of an expandable rim assembly in accordance with the disclosure.

An exploded view of an expandable rim assembly 200 is shown in FIG. 2. The expandable rim assembly 200 may be associated with a machine (e.g., the buffing machine 100) in much the same way as the expandable rim 104 described above and shown in FIG. 1. The expandable rim assembly 200 is configured for use with a hub (e.g., the hub 108), which includes surfaces that push radially ramped portions of a plurality of segmented shoes 202 that make up the expandable rim radially outward, thus pushing them apart to expand the rim assembly 200.

As shown in FIG. 2, the expandable rim assembly 200 includes the plurality of segmented shoes 202 that, together, form a cylindrical rim structure 204. Each of the plurality of segmented shoes 202 extends over an angle around the cylindrical rim structure 204, which in some embodiments may be about 30 degrees, such that twelve shoes 202 complete the cylindrical structure 204, but other angles and number of shoes can be used. Radially extending slits 206 extending through the cylindrical rim structure 204 result at the interfaces between adjacent shoes 202. Each slit 206 is covered by a respective support plate 208, which has a generally curved shape that is consistent with an outer drum surface 210 of the cylindrical rim structure 204. Each support plate 208 forms two posts 212, each of which locates the support plate 208 on the outer surface 210 of the cylindrical structure 204 (also referred to herein as "outer drum surface 210") by being inserted into a corresponding opening 214 formed by shallow cutouts or detents in the edges of the shoes 202 along the slits 206.

A skirt or belt 216 having a generally cylindrical shape is placed around and covers the outer drum surface 210 of the cylindrical rim structure 204. One or more (two shown) air conduits 220 provide compressed air to and from a nipple 222 through a series of aligned openings along an air path 224 to an air nozzle 226 that is connected to the belt 216 and disposed within the interior of a tire (e.g., the tire 102) when the tire is mounted onto the expandable rim assembly 200. In this way, the tire can be inflated and deflated, as desired, by providing or evacuating air to/from the air nozzle 226. Bolts 228 that engage nuts 230, or a different fastening arrangement, can be used to retain the belt 216 around the cylindrical rim structure 204 such that the belt 216 is prevented from rotating relative to the cylindrical rim structure 204 and the shoes 202 are held together.

Figure 3:
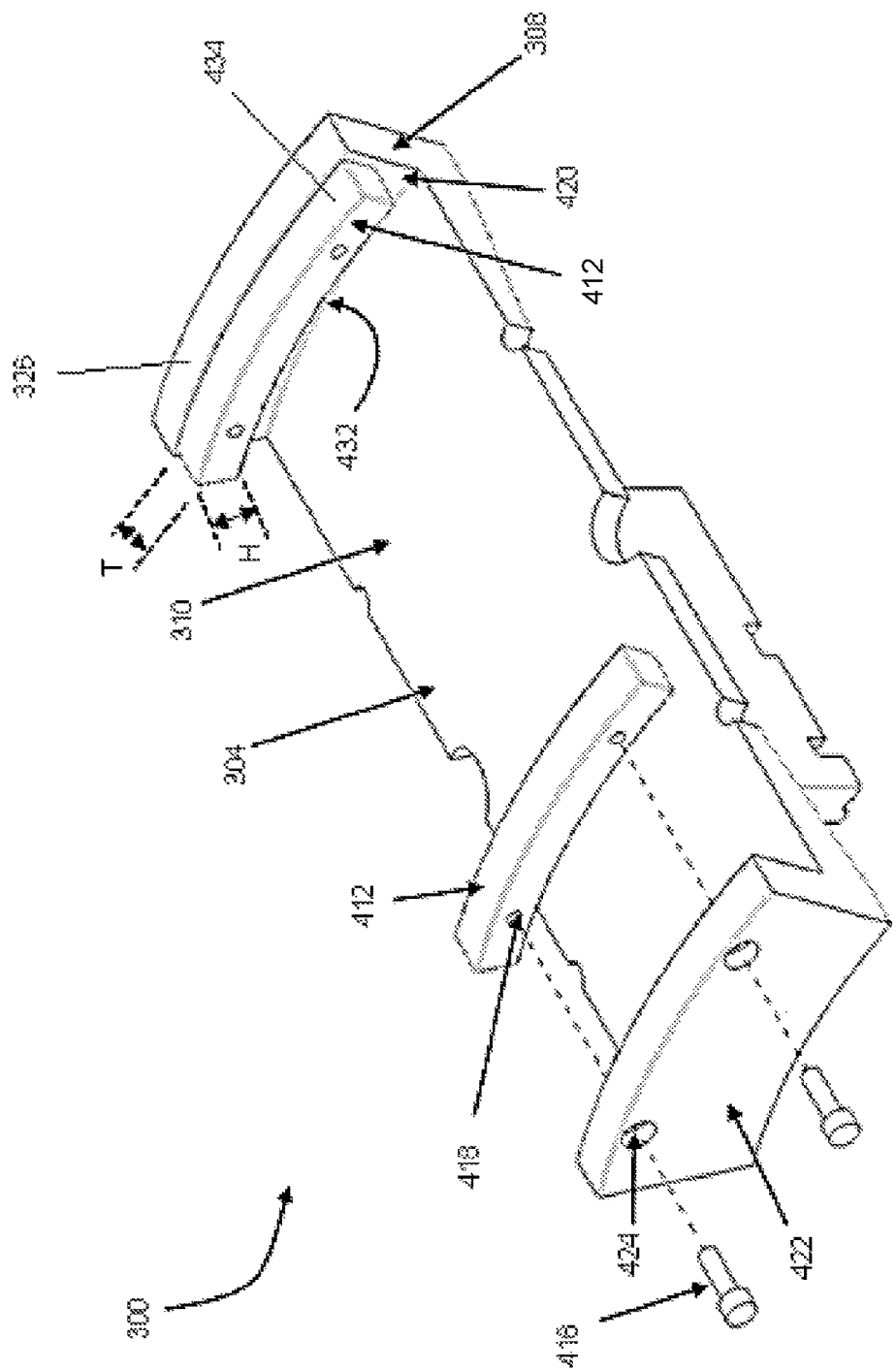
FIG. 3 is a perspective view of a shoe in accordance with the disclosure.
Figure 4:
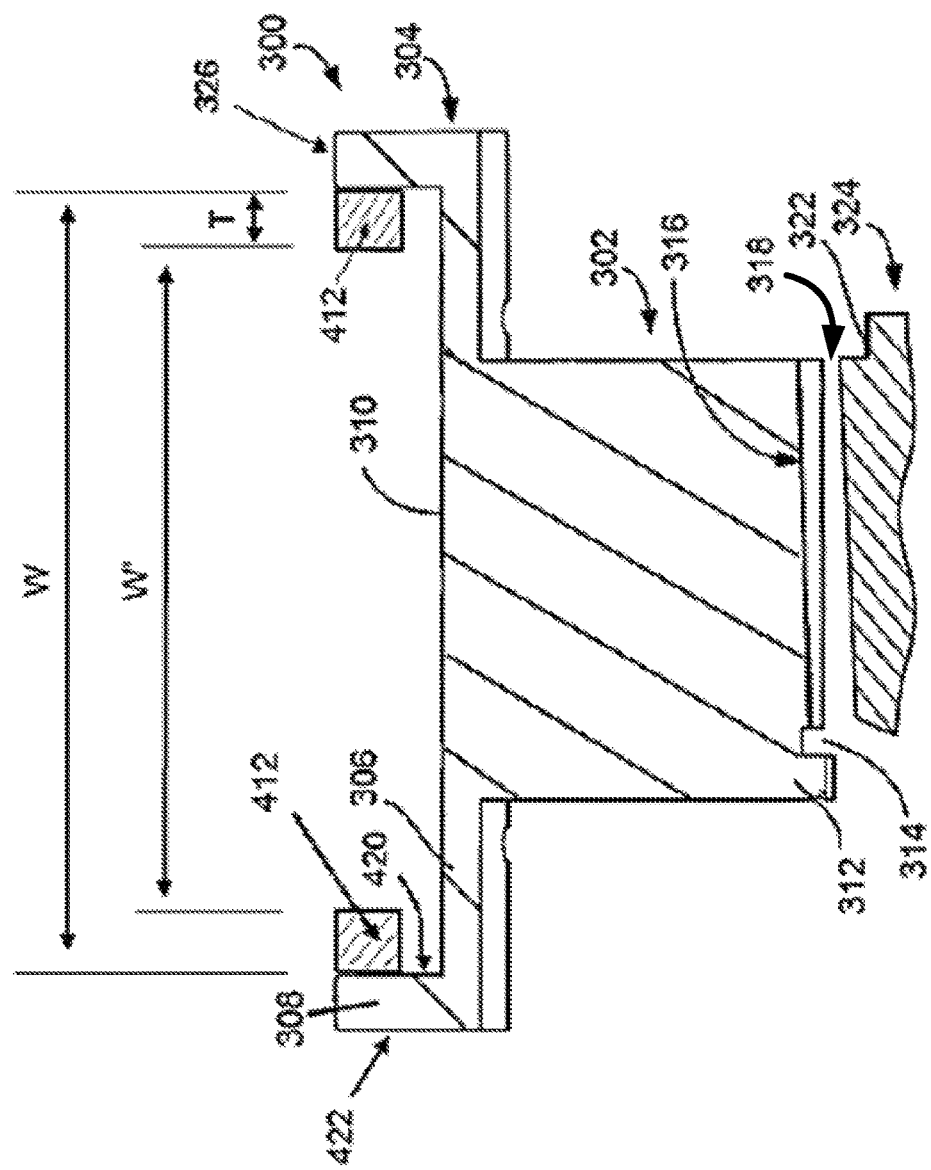
FIG. 4 is a fragmented view of a shoe in accordance with the disclosure.

FIG. 3 is a perspective view a shoe 300 and FIG. 4 is a side cross-section of the shoe 300. The shoe 300 may be used in an expandable rim, for example, in place of one or each of the shoes 202 that make up the expandable rim assembly 200 shown in FIG. 2 and described above. The shoe 300 includes a base portion 302, which is sometimes referred to as the shank and which is generally plate-shaped, and a rim portion 304, which defines a circular segment of an expandable rim. The rim portion 304 includes a rim segment 306 and a flange segment 308, which together form a structure having a generally U-shaped cross section, into which a tire may be accommodated. The rim segment 306 includes a drum surface 310 onto which other structures may be disposed such as, for example, the support plates 208 and/or portions of the inner belt 216, when the shoe 300 has been assembled into an expandable rim assembly such as the expandable rim assembly 200 (FIG. 2).

At the radially inward part of the shoe 300, on the end of the base portion 302, various features are formed that facilitate the mounting, retention, and relative motion of the shoe 300 with respect to a conical hub (e.g., the hub 108) around which the shoes 300 are positioned, when the rim is expanding or contracting during operation. It should be appreciated that although the interface features shown may be common across different expandable rim assemblies, other features than those shown here can be used. As shown in FIG. 4, the end of the base portion 302 that is the furthest away from the rim portion 304 forms a step 312 that is disposed next to a notch 314. A ramp 316 formed at the bottom of a V-shaped channel 318 extends away from the end of the base portion 302, towards the rim portion 304, in a direction away from the step 312 along the bottom edge of the base portion 302. When the shoe 300 is assembled into an expandable rim assembly, for example, the expandable rim assembly 200 (FIG. 2), the ramp 316 and channel 318 matingly and slidably engage a rib 322 of a conical hub 324 that actuates the shoe 300.

A perspective view of the shoe 300 with a set of adapters, for example, inserts 412, is shown in FIG. 3. The inserts 412 are generally flat plates with an annular shape and a curvature that matches the curvature of the inside face 420 of each flange segment 308 and has a rectangular cross section. The inserts 412 have a bottom surface 432 and a top surface 434 such that the curvature of the bottom surface 432 is generally concentric with the curvature of the top surface 434. The inserts 412 extend over the same circular segment as the shoe 300 they are installed on to preserve unobstructed operation of the expandable rim assembly, for example, the assembly 200 discussed above. The inserts 412 are attached to an inside face 420 of each flange segment 308. A pair of inserts 412 is thus attached to each shoe 300 of the expandable rim assembly 200.

The inserts 412 are attached to the inside face 420 of each flange segment 308 with the bottom surface 432 of the insert 412 elevated from, and not in contact with, the drum surface 310. In this configuration, the inserts 412 are installed over the belt 216. Alternatively, the bottom surface 432 of the insert 412 may be curved to provide a flush contact between the bottom surface 432 and the drum surface 310. In this alternate configuration, the inserts 412 are installed adjacent the belt 216. A wall thickness, T, of each insert 412, which wall thickness is measured as a distance each insert 412 extends from the inside face 420 of the respective flange segment 308 to which the insert 412 is attached to, is the same for the inserts 412 attached to all of the shoes 300 for a given expandable rim assembly 200, such that a width of the drum surface 310 that accommodates the bead of a tire is reduced. Similarly, a height H of the insert 412, as measured by how far the insert 412 extends from the top surface 434 towards the drum surface 310, can have any height sufficient to laterally retain the bead and/or sidewall of the tire or casing disposed between the inserts 412 while still allowing the insertion and removal of the tire or casing onto the expandable rim assembly. For example, the height can be at minimum, the distance from the top surface 326 of the flange segment 308 to a clearance above the belt 216 and at maximum, the distance that the flange segment 308 extends radially from the drum surface 310 so that normal or expected operation of the expandable rim is not affected. Other heights may also be used.

The inserts 412 can be made from plastic, steel, aluminum, or any other suitable material. The inserts 412 can be cast, machined, or otherwise fashioned. In an embodiment shown in FIG. 3, the inserts 412 are attached to the flange segments 308 with a fastener. A threaded fastener 416 passes through an opening 424 formed by the flange segment 308 and an opening 418 formed by the insert 412 to fasten the insert 412 to the flange segment 308. In some embodiments, the threaded fastener 416 can pass from the outside face 422 of the flange segment 308 through the opening 424 of the flange segment 308, which is not threaded, and into the opening 418 of the insert 412, which is threaded. In some embodiments, the threaded fastener 416 can pass from an inner side face of the insert 412 through the opening 418 of the insert 412, which is not threaded, and into the opening 424 of the flange segment 308, which is threaded. Alternatively, the insert 412 can be fastened to the flange segment 308 using welding, pinning, or other methods. Once attached, the inserts 412 modify the original expandable rim width W, which extends between inward facing surfaces of the flange, to a new shorter expandable rim width W', which extends between the inward facing surfaces of the inserts 412.

Figure 5:
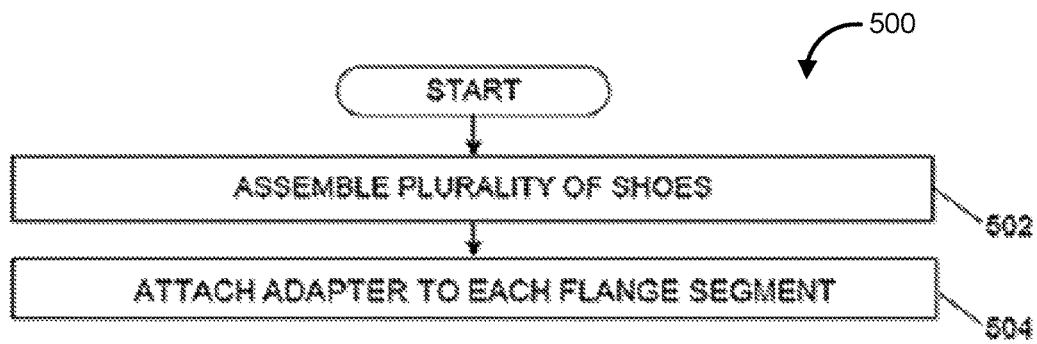
FIG. 5 is a flowchart for a method for modifying the width of an expandable rim.

A flowchart for a method 500 of modifying a rim width of an expandable rim in accordance with the disclosure is shown in FIG. 5. At step 502, a plurality of shoes are assembled to form a cylindrical rim structure. Each of the plurality of shoes includes a rim portion and a base portion. The rim portion includes a rim segment with a flange segment disposed on each side of the rim segment. The rim segment has an original rim width measured along a rotation axis of the rim between inward facing surfaces of the flange segments. The plurality of shoes can include, for example the shoes 200 or 300 described before herein which are assembled on a hub, e.g., the hub 108 as described in detail with respect to FIGS. 1-2.

At step 504, an adapter is attached to at least one flange segment of each of the plurality of shoes. For example, the inserts 412 are attached to an inward surface of the flange segment 306 of the shoe 300. The inserts 412 can be attached using any suitable means, for example fasteners, welded, snap-fit, via adhesive, etc. as described herein. It should be appreciated that, depending on the desired rim width, a single adapter and/or insert may be installed on only one flange segment of the shoe rather than a pair positioned opposite to each other, as shown in the flowchart of FIG. 5 herein. The adapter extends over a circular segment of the expandable rims formed by the rim portion of the plurality of shoes and has a circular curvature corresponding to a circular curvature of the rim portion of each of the plurality of shoes.

In various embodiments, a belt or skirt is positioned around the plurality of shoes, for example to provide form a seal with beads of a tire positioned on the rim segment, as described herein. Attaching the adapters on the flange segments causes the expandable rim to have an resulting rim width measured along the rotation axis of the rim between the inward facing surface of the adapter and an inward facing surface of the flange segment on the other side of the rim, or an inward facing surface of another adapter attached to the inward facing surface of the flange segment on the other side of the rim. The resulting rim width is different from the original rim width, for example smaller than the original rim width.

Figure 6:
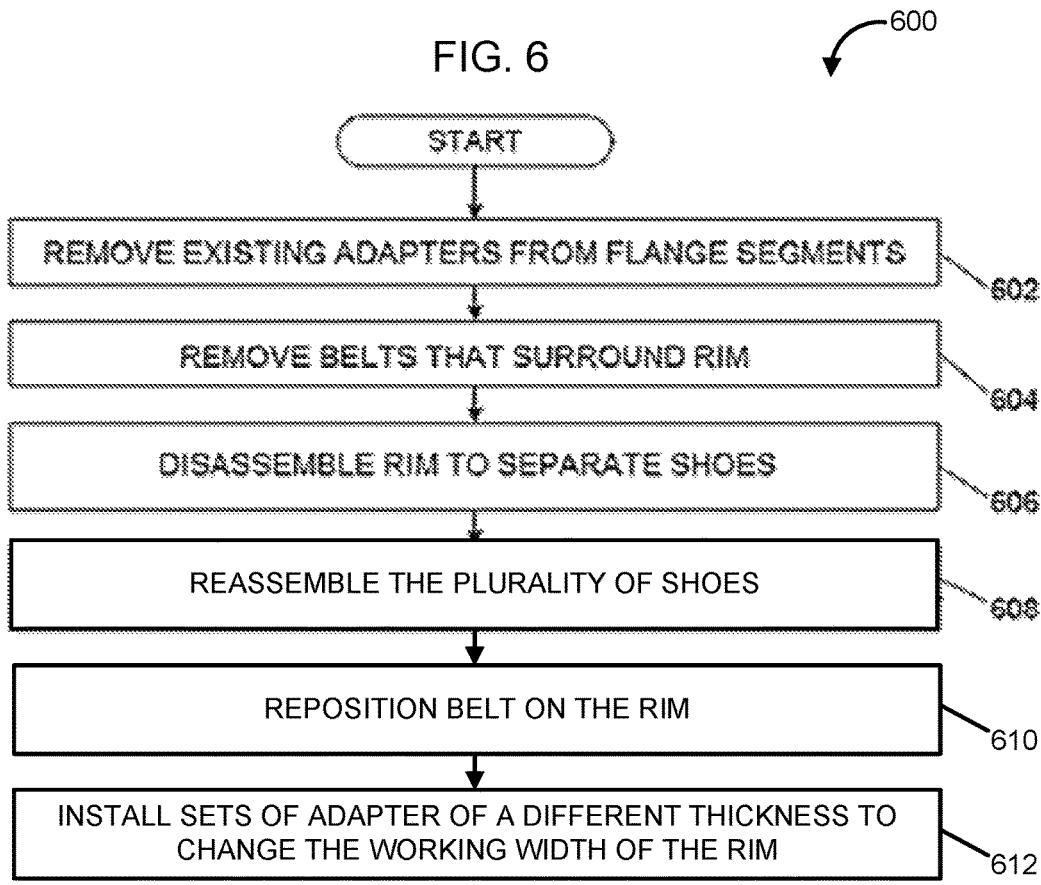
FIG. 6 is a flowchart for a method for servicing a modified expandable rim in accordance with the disclosure.

A flowchart for a method 600 of modifying a rim width of an expandable rim which includes a plurality of adapters coupled to flange segments of a plurality of shoes (e.g., the shoes 200 or 300) included in the expandable rim in accordance with the disclosure is shown in FIG. 6. An existing set of adapters is removed from a plurality of shoes at step 602. For example, the plurality of adapters 412 coupled to the flange segments 308 of the plurality of shoes 300 are removed from the flange segments 308 by removing fasteners 416 coupling the adapters 412 to the flange segment 308 of the plurality of shoes 300. The plurality of shoes include a rim portion and a base portion. The rim portion includes a rim segment and flange segments on either side of the rim segment. Furthermore, the adapter extends over the same circular segment of the expandable rim as a rim portion of the plurality of shoes and the adapter has a same circular curvature as the rim portion of the plurality of shoes.

At step 604, a belt surrounding the expandable rim is removed. For example, the belt or skirt 216 surrounding the cylindrical rim structure 204 formed by the plurality of shoes 202 is removed. A plurality of shoes that form the cylindrical structure are disassembled at step 606. For example, each of the plurality of shoes 202 forming the cylindrical rim structure 204 are disassembled or otherwise removed thereby dismantling the cylindrical structure 204.

At step 608, the plurality of shoes are reassembled to form the expandable rim. For example the plurality of shows 202 are disassembled during a downtime or maintenance operation of a buffing machine (e.g., the machine 100) and reassembled for buffing another tire. At step 610, the belt is repositioned on the expandable rim. At step 612, the existing adapter is replaced with at least one new adapter, for example a new set of adapters, with a different thickness to change the working width of the rim, is installed. Expanding further, a new set of adapters 412 which have a second thickness different from the thickness of the adapters originally attached to the flange segment 308 of the shoes 300 are now coupled to the at least a portion of the flange segment 308 of the rim portion 304 of the shoe 300. The thickness of the new set of inserts 412 can correspond to a width of a tire, i.e., the distance between the inward surface of the new set of inserts 412 defines a resulting rim width corresponding to the width of the tire, thereby allowing secure mounting of the tire thereon, as described previously herein. It should be appreciated that, to service broken or worn out adapters, a new set of adapters can have the same thickness as the existing set of adapter. It should also be appreciated that, depending on the desired rim width, a single expander and/or insert may be installed rather than a pair, as shown in the flowchart herein.

In some embodiments, the existing adapters or inserts mounted on the flange segment can be replaced with new adapters or inserts without disassembling the expandable rim. For example, to replace the existing adapter or inserts with the new adapters or inserts (e.g., the inserts 412 or any other inserts described herein), a user can simply remove the expandable rim from a hub of a buffing machine (e.g., hub 108 of buffing machine 100) and replace the existing adapters or inserts with new adapters without disassembling the expandable rim. The expandable rim with the new adapters or inserts can be mounted back on the hub and used for mounting a tire thereon for buffing as described herein.

The use of the terms "a" and "an" and "the" and similar referents in the context of describing embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the embodiments unless otherwise claimed. No language in the specification should be construed as indicating any non-claimed element as essential to the practice of the embodiments.

It should be noted that the term "example" as used herein to describe some embodiments is intended to indicate that some embodiments are possible examples, representations, and/or illustrations of possible embodiments (and such term is not intended to connote that some embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

Some embodiments are described herein. Variations of those-embodiments may become apparent to those of ordinary skill in the art upon reading the foregoing description. The inventors expect skilled artisans to employ such variations as appropriate, and the inventors intend for the embodiments to be practiced otherwise than as specifically described herein. Accordingly, embodiments include all modifications and equivalents of the subject matter recited in the claims appended hereto as permitted by applicable law. Moreover, any combination of the above-described elements in all possible variations thereof is encompassed by the embodiments unless otherwise indicated herein or otherwise clearly contradicted by context.

It is important to note that the construction and arrangement of the various embodiments are illustrative only. Although some embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein.

The invention claimed is:

1. A machine comprising:
    an expandable rim configured to be disposed around a moveable hub, the expandable rim including a plurality of shoes arranged symmetrically in a circumferential direction,
    each of the plurality of shoes including a base portion and a rim portion, the base portion positioned closer to the axis of rotation, the rim portion including a rim segment and flange segments on either side of the rim segment, the rim segment having an original rim width measured along the rotation axis of the rim between inward facing surfaces of the flange segments;
    a belt being disposed along the rim segment of the plurality of shoes; and
    an adapter attached to a flange segment of each of the plurality of shoes, the adapter extending over a circular segment of the expandable rim formed by the rim portion of the plurality of shoes, the adapter having a circular curvature corresponding to a circular curvature of the rim portion of each of the plurality of shoes;
        wherein a resulting rim width measured along the rotation axis of the rim between at least one inward facing surface of the adapter and an inward facing surface of the flange segment at another side of the rim is different than the original rim width, and
        wherein the adapter is an insert, the insert being a flat plate with an annular shape, the insert being attached to and extending away from an inward facing surface of the flange segment on one side of the rim, wherein the resulting rim width is measured between an inward facing surface of the insert on the one side of the rim and the inward facing surface of the flange segment on an opposite side of the rim.

2. The machine of claim 1, wherein the adapter and the flange segment are connected using fasteners.

3. The machine of claim 1, wherein the adapter is made of metal or plastic.

4. The machine of claim 1, wherein the adapter extends from adjacent a top surface of the flange segment to a distance above the belt.

5. The machine of claim 1, wherein the insert is a first insert, the machine further comprising:
    a second insert attached to the inward facing surface of the flange segment at the another side of the rim, the insert being attached to and extending away from the inward facing surface of the flange segment on the opposite side of the rim, wherein the resulting rim width is measured between an inward facing surface of the insert on the one side of the rim and an inward facing surface of the insert on the opposite side of the rim.

6. The machine of claim 1, wherein the base portion of the shoe has a generally flat planar shape.

7. The machine of claim 1, wherein the base portion of the shoe forms a channel is generally V-shaped and a ramp is formed as an edge along a bottom of the channel.

8. The machine of claim 1, wherein the base portion of the shoe forms a channel at one end and is connected to the rim portion at an opposite end.

9. The machine of claim 1, further comprising support plates arranged around the expandable rim.

10. A method for modifying a width of an expandable rim for use in a tire retreading machine comprising:
    assembling a plurality of shoes to form a cylindrical rim structure, each of the plurality of shoes including a rim portion and a base portion, the rim portion including a rim segment and flange segments on either side of the rim segment, the rim segment having an original rim width measured along a rotation axis of the rim between inward facing surfaces of the flange segments; and attaching an adapter to at least one flange segment of each shoe of the plurality of shoes, the adapter extending over a circular segment of the expandable rim formed by the rim portion of the plurality of shoes, the adapter having circular curvature corresponding to a circular curvature of the rim portion of each of the plurality of shoes;

wherein a resulting rim width measured along the rotation axis between at least one inward facing surface of the adapter and an inward facing surface of the flange segment on the other side of the rim or an inward facing surface of another adapter attached to the inward facing surface of the flange segment on the other side of the rim is different than the original rim width, and wherein the adapter is an insert, the insert being a flat plate with an annular shape, the insert being attached to and extending away from an inward facing surface of the flange segment on one side of the rim, wherein the resulting rim width is measured between an inward facing surface of the insert positioned on one side of the rim and the inward facing surface of the flange segment at an opposite side of the rim, or an inward facing surface of another insert attached to the inward facing surface of the flange segment on the other side of the rim, and wherein the resulting rim width is smaller than the original rim width.

11. The method of claim 10, further comprising placing a belt around the plurality of shoes after assembling the plurality of shoes.

12. The method of claim 11, wherein the adapter extends from adjacent a top surface of the flange segment to a distance above the belt.

13. The method of claim 10, wherein the adapter and the flange segment are connected using fasteners.

\* \* \* \* \*